United States Patent [19]

Matsuzawa et al.

[11] Patent Number: 4,838,226
[45] Date of Patent: Jun. 13, 1989

[54] APPARATUS FOR CONTROLLING INTAKE AIR FLOW RATE IN INTERNAL COMBUSTION ENGINE

[75] Inventors: Toshio Matsuzawa, Kariya; Kazuji Minagawa, tokoname; Akira Muramatsu, Kariya; Tomoaki Abe, Obu; Masashi Kiyono, Anjo; Shigeru Kamio, Nagoya; Katsuya Maeda; Mitsunori Takao, both of Kariya, all of Japan

[73] Assignee: Nippondenso Co., Ltd., Kariya, Japan

[21] Appl. No.: 191,218

[22] Filed: May 6, 1988

[30] Foreign Application Priority Data

Dec. 12, 1986 [JP] Japan ................... 61-297396
May 9, 1987 [JP] Japan ................... 62-112887
Aug. 9, 1987 [JP] Japan ................... 62-199489

[51] Int. Cl.$^4$ .................. F02D 9/10; F02D 11/10
[52] U.S. Cl. ..................... 123/399; 123/361
[58] Field of Search ................. 123/361, 399, 400

[56] References Cited

U.S. PATENT DOCUMENTS 4,161,928 7/1979 Teague et al. ............... 123/445 X
4,283,355 8/1981 Herd, Jr. et al. ............ 74/568 R X
4,492,198 1/1985 Okumura ..................... 123/413
4,590,895 5/1986 Yada et al. ................. 123/393 X

FOREIGN PATENT DOCUMENTS 21389 6/1973 Japan .
193735 11/1982 Japan .
153945 9/1984 Japan .
190440 10/1984 Japan .
196936 11/1984 Japan .
226244 12/1984 Japan .
49235 4/1985 Japan .
26206 8/1985 Japan .

Primary Examiner—Tony M. Argenbright
Attorney, Agent, or Firm—Cushman, Darby & Cushman

[57] ABSTRACT

An apparatus for controlling intake air flow rate in an internal combustion engine comprises a throttle valve disposed in intake air passage for swing movement to change a flow rate of air to be supplied to combustion chambers of the engine, a stopper portion to which the throttle valve is abutted so as to stop swinging thereof in a full closed portion thereof, a spring for continually urging the throttle valve towards the full closed position, a control unit for determining a desired opening degree of the throttle valve in accordance with requirements on the engine, an actuator for generating a driving force for swinging the throttle valve to the desired opening degree in accordance with a command signal from the control unit, and geared mechanism for transmitting the driving force from the actuator to the throttle valve. The geared mechanism includes a pair of gears, each having a gear tooth portion. The gears are able to engage with each other exclusively at such gear tooth portions. The gear tooth portion so extends that both of the gear tooth portions mesh with each other between full closed position and full open position of the throttle valve, and they are pushed out of mesh with each other over full open position of the throttle valve.

8 Claims, 11 Drawing Sheets

APPARATUS FOR CONTROLLING INTAKE AIR FLOW RATE IN INTERNAL COMBUSTION ENGINE

FIELD OF THE INVENTION AND RELATED ART STATEMENT

The present invention relates to an apparatus for controlling an intake air flow rate in an internal combustion engine, and more particularly to a control apparatus in which a throttle valve is swung by means of an actuator so as to control a flow rate of air to be supplied to the internal combustion engine.

In this technical field, an electric control apparatus is known, which incorporates a microcomputer and an actuator electrically controlled to drive the throttle valve into a desired opening degree position in accordance with command signals from the microcomputer and which has no mechanical linkage with a pedal of an accelerator of a vehicle to which the electric control apparatus is applied. In such electric control apparatus, it is considerably required to establish a fail-safe system to such electric control apparatus, which forcedly transfers the throttle valve to a safe position on occurrence of breakdown or irregular operation of the actuator.

In one of such prior art fail-safe systems, an electric control circuit is provided in the control apparatus for driving the throttle valve towards the closed position on occurrence of abnormal operation of the engine. However, in this fail-safe system, there is a problem that safety is not fully obtained against occurrence of breakdown or irregular operation of the electric control circuit.

In another one of such prior art fail-safe system, as shown in JP-A-No. 59-190440, an engaging member is provided in the control apparatus and is mechanically coupled to the accelerator pedal so as to close the throttle valve in connection with return motion of the accelerator pedal. According to this fail-safe system, in case of the breakdown of a servomotor for driving the throttle valve, if the accelerator pedal is returned, the throttle valve is forcedly closed by the engaging member.

However, in this case, the engaging member is mechanically linked with the accelerator pedal, so that it is not possible to obtain a full electrical control apparatus with no mechanical linkage with the accelerator pedal.

OBJECT AND SUMMARY OF THE INVENTION

Accordingly an object of the present invention is to provide an electric control apparatus incorporating a non-electrical fail-safe system which is constituted by mechanical members only and which has no mechanical linkage with the accelerator pedal.

According to the present invention, provided is an apparatus for controlling intake air flow rate in an internal combustion engine comprising a throttle valve means disposed in intake air passage means of the engine for swing movement so as to change a flow rate of air to be supplied to combustion chambers of the engine, means for determining a full closed position of the throttle valve, resilient means for continually urging the throttle valve towards the full closed position, a control unit for determining a desired opening degree of the throttle valve in accordance with requirements on the engine, actuator means for generating a driving force for swinging the throttle valve towards the desired opening degree in accordance with command signals from the control unit, and a geared mechanism for transmitting the driving force to the throttle valve. The geared mechanism includes a pair of gears, each of which has a gear tooth portion. The gear tooth portion so extends that both of the gear tooth portions mesh with each other between full closed position and full open position of the throttle valve, and they are pushed out of mesh from each other over full open position of the throttle valve, whereby when the throttle valve is driven to swing over the full open position, these gears are disengaged from each other and then the throttle valve is returned back to the full closed position by means of the resilient means.

DETAILED DESCRIPTION OF PREFERRED EMBODIMENTS

Figure 1:
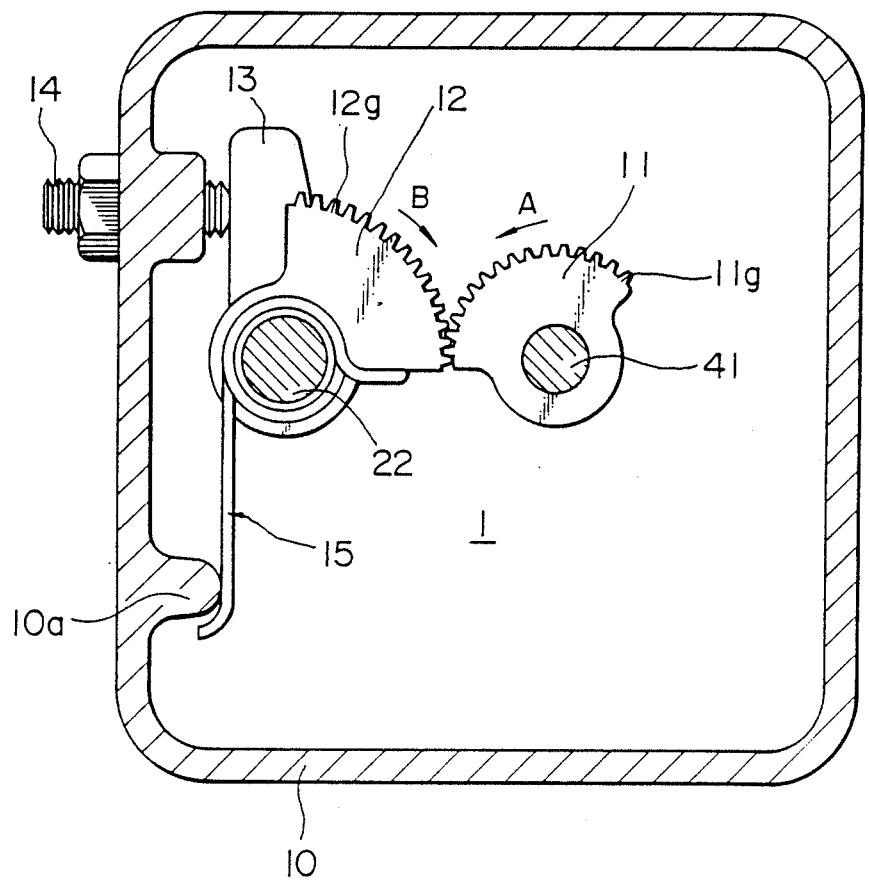
FIG. 1 is a sectional view taken along the line I—I in FIG. 2.
Figure 2:
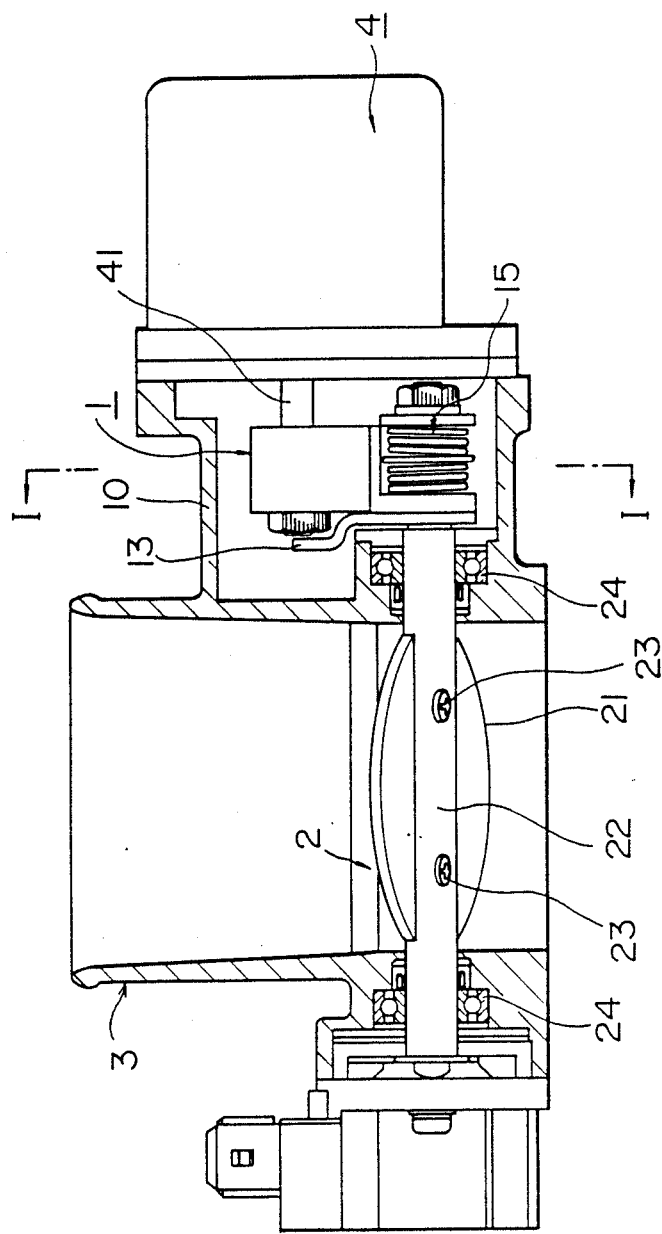
FIG. 2 is a sectional view showing a throttle portion of an intake air passage shown in FIG. 3.

FIG. 1 shows a geared transmitting mechanism 1, associated to a throttle valve 2 detailed shown in FIG. 2, in a control apparatus according to one embodiment of the present invention. The throttle valve 2 is incorporated in an intake part of an internal combustion engine as shown in FIG. 3.

Figure 3:
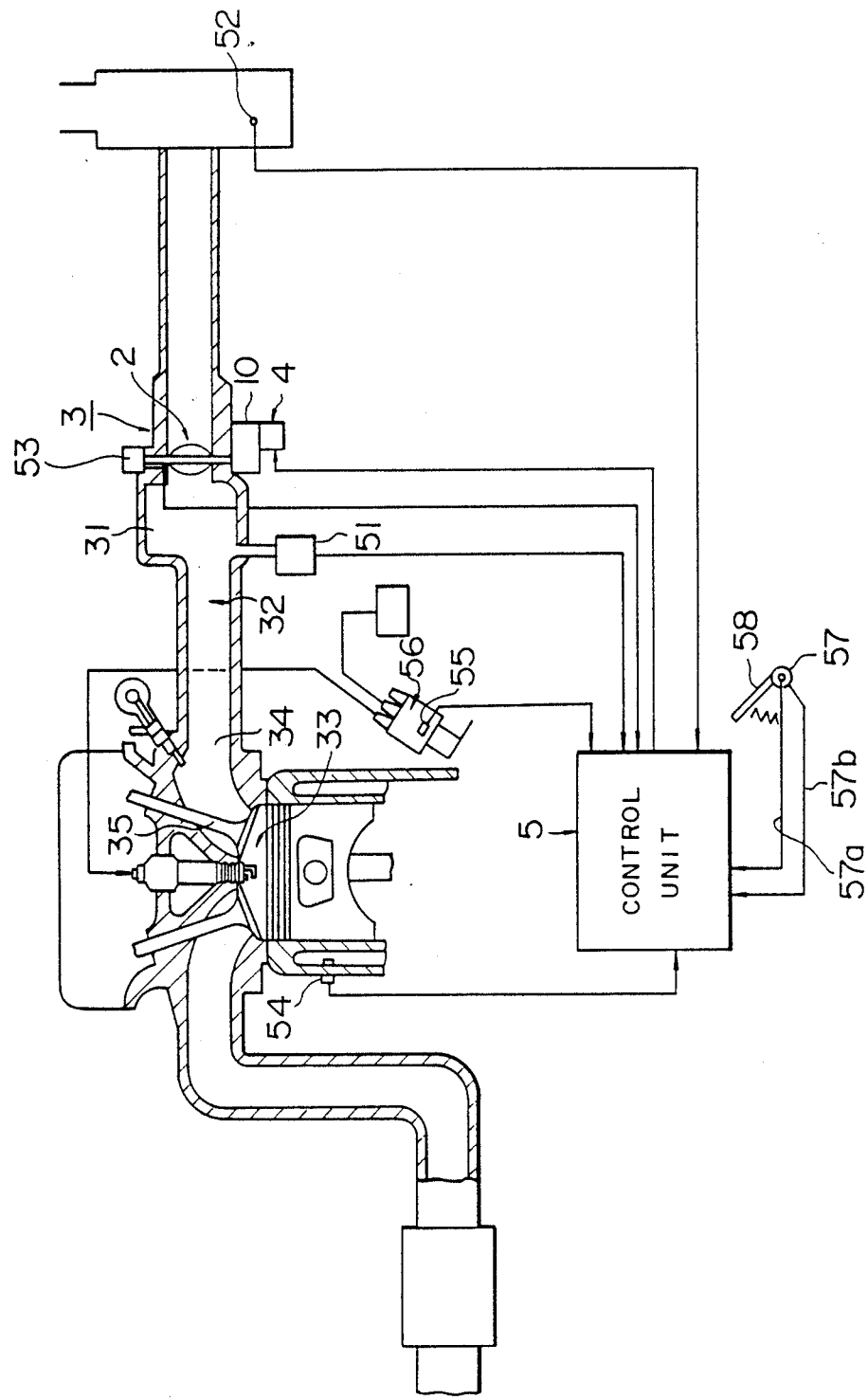
FIG. 3 is a diagrammatic view showing one embodiment of the present invention.

As clearly shown in FIG. 3, the throttle valve 2 is disposed within an intake pipe 3, and is located adjacent to and upper stream side of a surge tank portion 31 of an intake air passage 32 with respect to the intake air flow. The throttle valve 2 is swingable for controlling a flow rate of air to be supplied into a combustion chamber 33 of the engine through an intake valve 35 is opened.

The throttle valve 2 is a butterfly valve and includes, as shown in FIG. 2, a valve element 21 and a valve shaft 22 to which the valve element 21 is secured by screws 23, 23. The valve shaft 22 is swingably journaled at opposite end portions thereof by the respective bearings 24, 24 in a wall of the intake pipe 3. The throttle valve 2 is driven by an actuator 4 to swing about an axis of the valve shaft 22. The actuator 4 is mounted onto a casing 10 for the geared transmitting mechanism 1, which projects outwards and is formed integrally with a wall of the intake pipe 3.

The actuator 4 is an electric one and is consisted of an electric motor, a gear box and so on. The actuator 4 is triggered by command signal from a control unit 5 and drives and rotates an output shaft 41. Torque is transmitted from the output shaft 41 to the valve shaft 22 through the geared transmitting mechanism 1 and then the throttle valve 2 is swung so as to change an opening degree thereof.

The control unit 5 receives information signals from a sensing system. The control unit 5 determines a desired opening degree of the throttle valve 2 on the basis of such information signals and outputs a command signal to the actuator 4 to swing the throttle valve into a position corresponding to the desired opening degree. The control unit 5 contributes exclusively toward performing an opening operation of the throttle valve 2. The sensing system includes a pressure sensor 51 for sensing pressure in the surge tank portion 31, a temperature sensor 52 provided in an air cleaner for sensing temperature therein, a throttle sensor 53 for sensing a swing angle of the throttle valve shaft 22, a temperature sensor 54 for sensing temperature of cooling water, and a sensor 55 provided in a distributor 56 for sensing an advanced angle, which distributes outputs thereof to the respective igniters. The sensing system further includes an accelerator sensor 57 mounted on an accelerator pedal 58. A continuous signal 57a representing a desired acceleration and a signal 57b representing a condition in that the accelerator pedal 58 is not depressed are inputted into the control unit 5 from the accelerator sensor 57.

As clearly shown in FIG. 1, the geared transmitting mechanism 1 includes a pinion 11 secured to the output shaft 41 without relative rotation therebetween, and a gear 12 secured to the valve shaft 22 without relative rotation therebetween.

Not only the pinion 11 but also the gear 12 is a sector gear having a gear tooth portion extending a part of a circular periphery. When the pinion 11 meshes at the gear tooth portion 11g thereof with the gear 12 at the gear tooth portion 12g thereof, the torque is transmitted from the output shaft 41 in the actuator 4 to the valve shaft 22 of the throttle valve 2. The gear tooth portions 11g and 12g are so extended that they come into mesh with each other on full closed position of the throttle valve 2, and they are pushed out of mesh from each other on full open position of the throttle valve 2.

As clearly shown in FIGS. 1 and 2, a lever 13 is mounted in the valve shaft 22 without relative rotation therebetween, so as to determine the throttle valve full closed position. When the throttle valve 2 positions in the full closed position, the lever 13 abuts against a bolt 14 to stop the valve element 21 from swinging over such full closed position. The bolt 14 is screw-mounted on a wall of the casing 10 for adjusting an amount of inward projection of the bolt 14. Accordingly, an air 10 leak from the throttle valve 2 on the full closed position thereof is changed by adjusting the amount of inward projection of the bolt 14.

On one end portion of the valve shaft 22, provided is a coil spring 15, one end of which is engaged with a projection 10a projecting from an inner wall surface of the casing 10, and the other end of which is engaged with one side end of the gear 12. The spring 15 constantly urges the valve shaft 22 to swing counterclockwise in FIG. 1. In other words, the spring force of the spring 15 continually urges the throttle valve 2 to open it, and also urges the pinion 11 and the output shaft 41 of the actuator 4 to swing clockwise in FIG. 1.

An operation of the above-mentioned system will be explained hereinunder.

When the accelerator pedal 58 is depressed by the operator, the accelerator sensor 57 delivers a signal corresponding to the depression of the accelerator pedal 58 to the control unit 5. The control unit 5 determines a primary torque of the actuator 4 for swinging the valve shaft 22, on the basis of the signal from the accelerator sensor 57. Further, on the basis of information from the pressure sensor 51, temperature sensor 52, the temperature sensor 54 and the sensor 55, the control unit 5 determines a desired opening degree of the throttle valve 2, and makes correction in the primary torque and then determines a final torque required to drive the throttle valve 2 to the desired opening degree position. The control unit 5 delivers a command signal to the actuator 4, which corresponds to the final torque. In case that a step motor is used in the actuator 4, the control unit 5 determines a primary displacement angle of the output shaft 41, instead of the primary torque.

On receipt of such command signal, the actuator 4 generates a torque corresponding to the command signal from the control unit 5 and drives the output shaft 41 to swing it in a direction designated by an arrow A. The swing motion of the output shaft 41 is transferred to the valve shaft 22 of the throttle valve 2 through the geared transmitting mechanism 1, namely meshing engagement between the gear tooth portion 11g of the pinion 11 and the gear tooth portion 12g of the gear 12. According this, the valve shaft 22 is driven to swing in a direction designated by an arrow B, and then the valve element 21 is positioned in a desired opening degree position.

During the operation of the engine, if the actuator 4 is accidentally activated to swing the valve element when the valve element is in the full open position, which is caused by an abnormal signal from the control unit 5, and/or by breakdown or irregularities in the actuator 4 and the control unit 5, the output shaft 41 is further swung over the full open position in a direction designated by the arrow A in FIG. 1. In this case, the pinion 11 and the gear 12 are pushed out of mesh, so that the valve shaft 22 is swung together with the gear 12 counter-clockwise (opposite to the direction of arrow B) in FIG. 1 by means of the spring force of the spring 15. According this, the valve element is swung back to the full closed position.

According to this embodiment, as apparent from the above explanation, even though the actuator 4 is broken down or irregularly activated, the throttle valve can not be held in the full open position, but is surely returned back to the full closed position, so that the safety is ensured. Since the safety measures are constituted by mechanical elements exclusively, such safety measures are extremely effective against electrical failure and breakdown of the electric control unit 5. Further, the safety measures has no mechanical linkage with the accelerator pedal 58.

Figure 4:
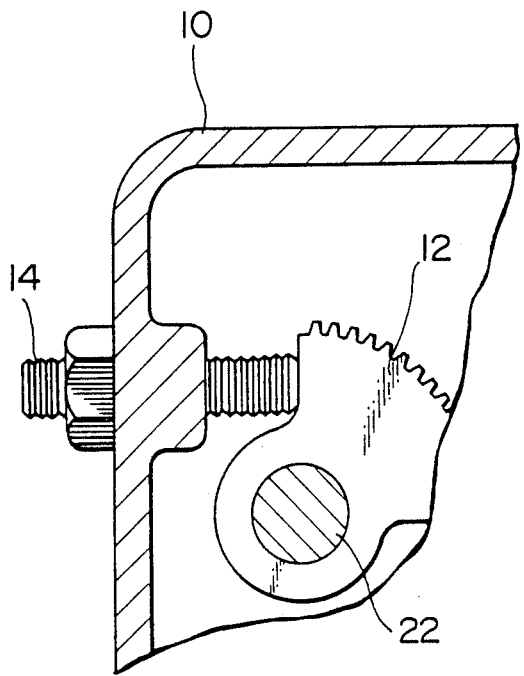
FIGS. 4 to 8 are sectional views showing geared transmitting mechanisms of another embodiments of the present invention, respectively.

FIG. 4 shows another embodiment. In this embodiment, the lever 13 is removed from the valve shaft 22, as compared with the first embodiment in FIG. 1. Instead of the lever 13, the bolt 14 is so extended that the gear 12 abuts at side end thereof against the bolt 14 on the full closed position of the throttle valve 2.

Figure 5:
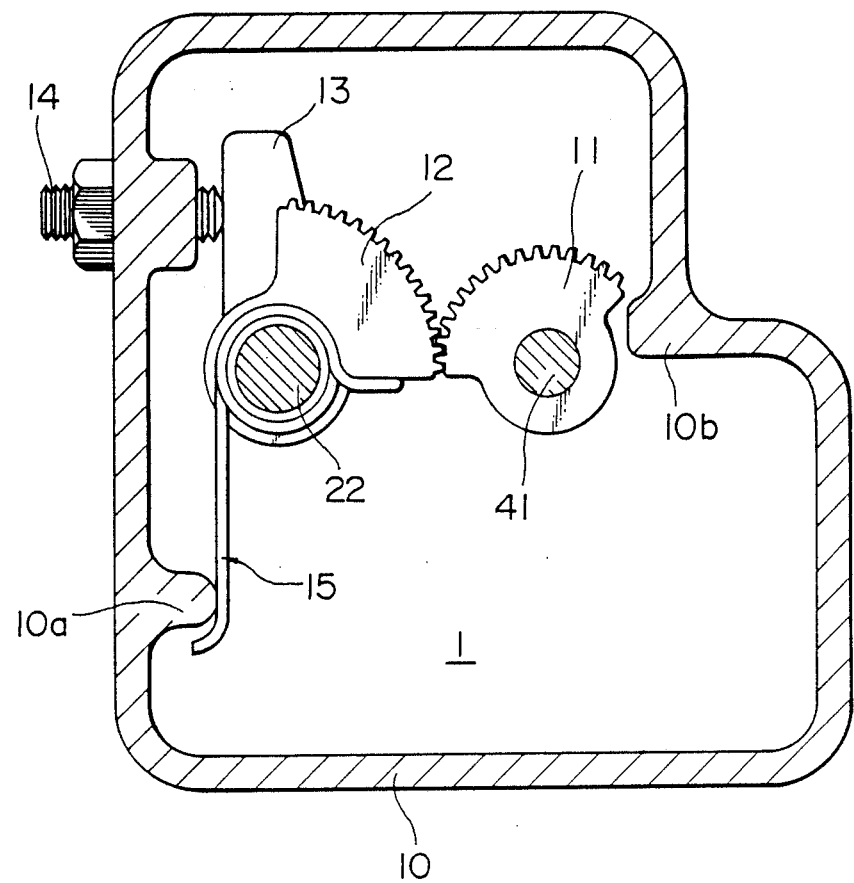

In the other embodiment shown in FIG. 5, the casing 10 is provided with another stopper projection 10b projecting from the inner wall surface thereof. The pinion 11 abuts against the stopper projection 10b and stops swinging counter-clockwise after the pinion 11 and the gear 12 are pushed out of mesh. The stopper projection 10b prevents the pinion from rotating to mesh with the gear 12 again, and then prevents the valve shaft 22 from swinging clockwise to open the throttle valve 2. Accordingly, the pinion 11 and the gear 12 are once pushed out of mesh, they can be never meshed with each other, so that the safety is further ensured. The stopper projection 10b can be replaced with any other means, e.g. a bolt or a pin.

Figure 6:
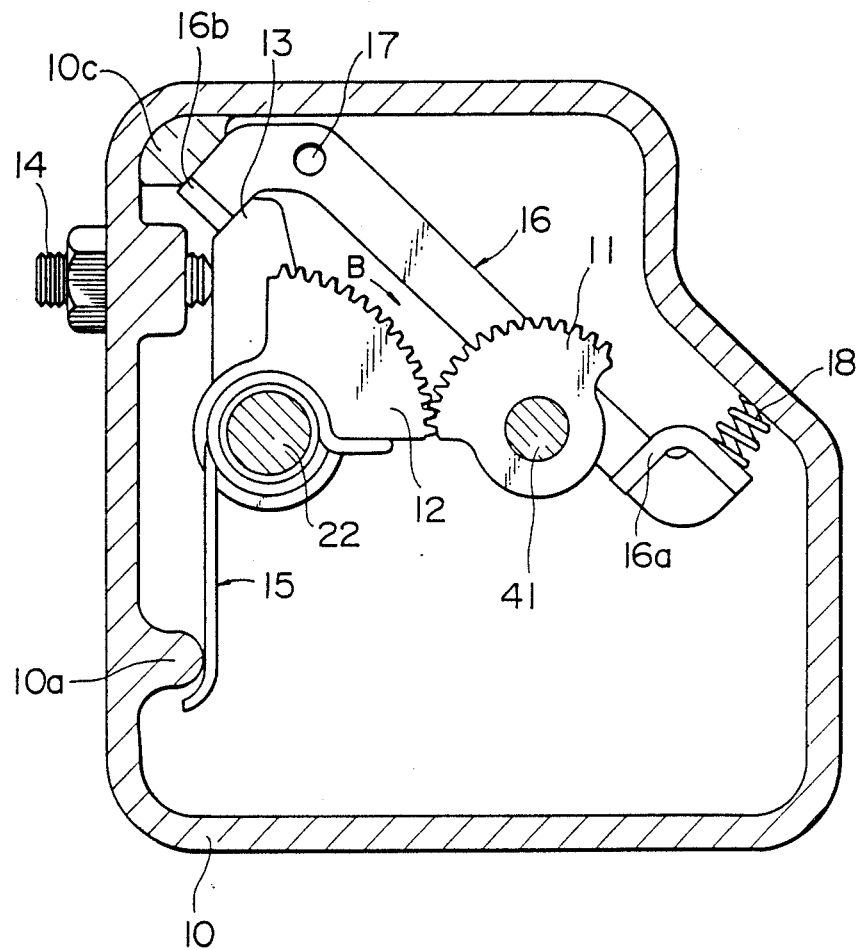

The embodiment shown in FIG. 6 is made with the intention of that a vehicle incorporating this embodiment can limp towards the safe place somehow even though any troubles are occurred in the vehicle. In this embodiment, an angled lever 16 is incorporated therein, which is pivotally mounted on a pivot pin 17 within the casing 10. The angled lever 16 is provided at one end portion thereof with a projection 16a. The angled lever 16 is constantly urged at the projection 16a by a spring 18 in a clockwise direction in the drawings. The angled lever 16 is also provided at the other end portion thereof with a projection 16b which is adapted to engage with a stopper portion 10c so as to stop the angled lever 16 from further pivoting when the angled lever 16 is pivoted in a clockwise direction by the spring 18. The projection 16b also engages with the lever 13.

In this arrangement, when the pinion 11 and the gear 12 are pushed out of mesh by accidentally activated behavior of the actuator 4, the valve shaft 22 is swung together with the lever 13 to return back to the full closed position. When the accidental activation of the actuator 4 is continued, he pinion 11 comes into contact with the projection 16a of the angled lever 16 and urges it to swing in counter-clockwise direction against the spring 18. According this, the projection 16b in the other end portion of the angled lever 16 is swung in counter-clockwise direction to make the lever 13 together with the valve shaft 22 swing somewhat in clockwise direction designated by arrow B. Accordingly, the throttle valve 2 is changed from the full closed position to a slightly opened position, so that the vehicle can be limpable.

Figure 7:
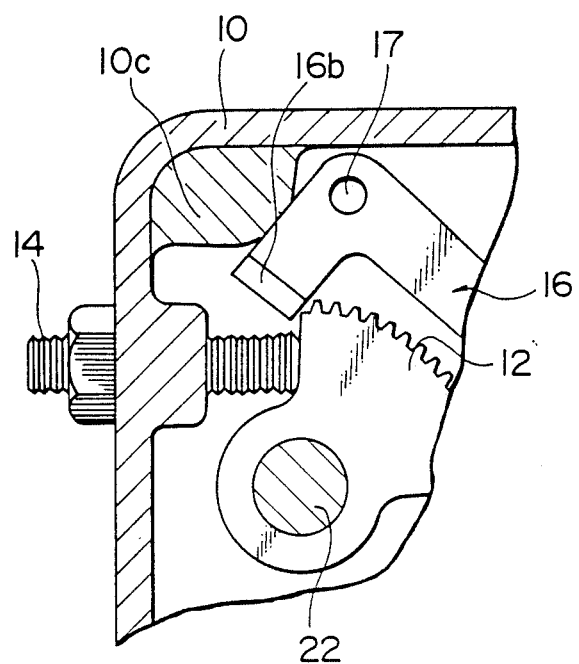

The embodiment shown in FIG. 7 has the same arrangement as the embodiment shown in FIG. 6 has except for the lever mounted on the valve shaft. The full closed position is determined by that the gear 12 abuts at the side edge thereof on the bolt 14. The projection 16b in the other end portion of the angled lever 16 is adapted to come directly into contact with the side edge of the gear 12 to make the valve shaft 22 swing somewhat in clockwise direction in the drawings on the full closed position, so that the throttle valve 2 can be slightly opened for limping of the vehicle on accident thereof. The stopper portion 10c can be replaced with any other means, e.g. a bolt or a pin.

Figure 8:
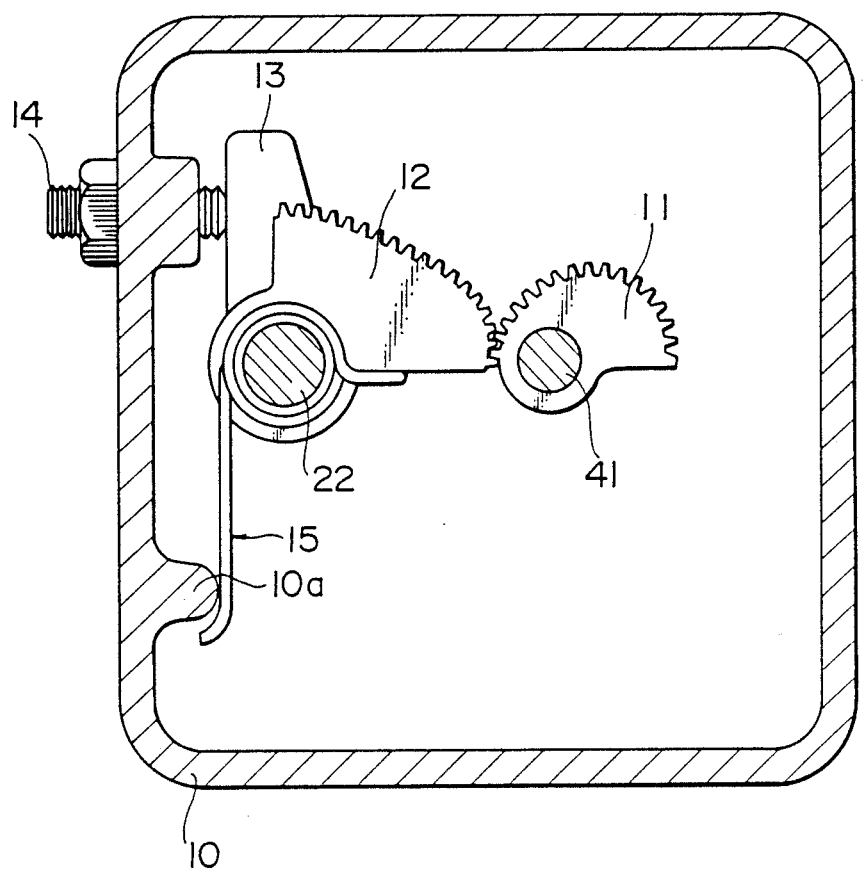

FIG. 8 shows a geared transmitting mechanism 1 in the still another embodiment. The pinion 11 and the gear 12 are sector gears each having a gear tooth portion extending along a part of a noncircle, and more particularly along a quarter of an ellipse. Accordingly, the rotation of the output shaft 41 of the actuator 4 is non-linearly transferred to the valve shaft 22. According to this arrangement, since, as apparent from FIG. 10, in a part where the opening degree of the throttle valve is smaller, the reduction gear ratio of the geared transmitting mechanism 1 is high, and in a part where the opening degree of the throttle valve is larger, the reduction gear ratio is gradually reduced, the opening degree resolution of the throttle valve becomes very fine in a practical steady driving of the vehicle in which fine resolution is required, and the time period from full closed position to full open position of the throttle valve is shortened, whereby a higher responsiveness can be obtained. The above-mentioned geared transmitting mechanism will be explained in detail hereinunder with referring to FIGS. 9 to 11.

The non-linear characteristics must consist of a linear part in low opening degree side and a curved part in high opening degree side, which is smoothly linked to the linear part. The curvature characteristics in the high opening degree side must correspond to a cubic function which is selected as a lowest order function from the functions satisfying the following four conditions.
(i) The curved part coincides at a linked point with the linear part in low opening degree side.
(ii) The curved part coincides at a linked point with the linear part in differential coefficient.
(iii) The curved part coincides at a linked point with the linear part in second order differential coefficient.
(iv) The whole revolution angle of the motor in the actuator is made as small as possible within the torque characteristics of the motor in the actuator.

Figure 10:
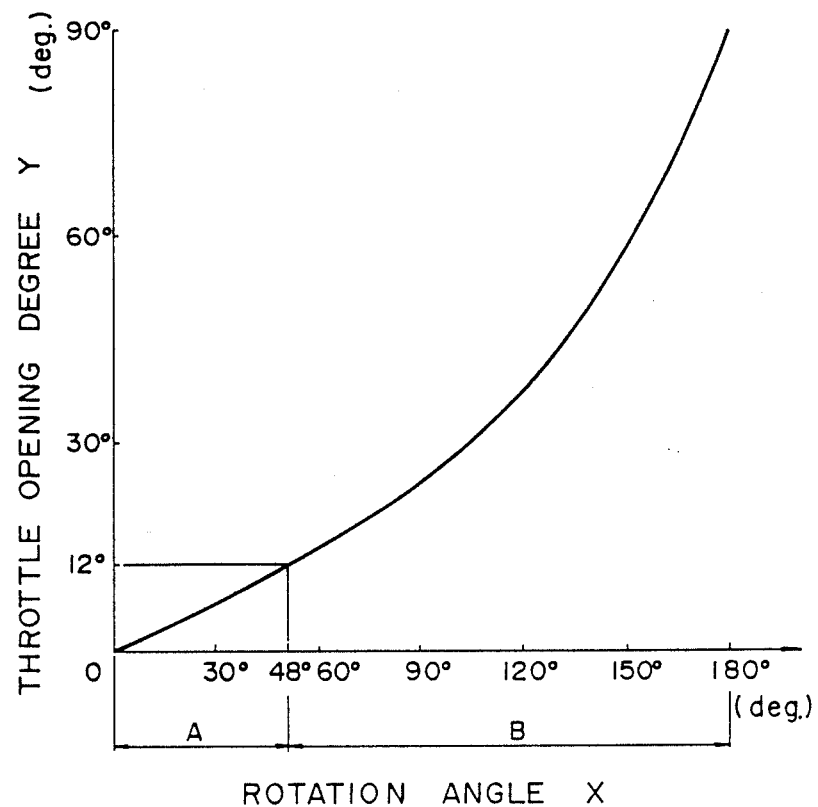
FIGS. 10 and 11 are diagrams showing the relationship between the opening degree of the throttle valve and the rotational angle of the actuator, respectively.

The non-linear characteristics satisfying the above conditions is specifically represented by the following equations 1 and 2, and shown in FIG. 10.

$$Y = X/4 \quad (0° \leq X \leq 48°) \quad \ldots (1)$$

$$Y = AX^3 + BX^2 + CX + D \quad (48° \leq X \leq 180°) \quad \ldots (2)$$

where,
$A = 1.9565 \times 10^{-5}$
$B = -2.8174 \times 10^{-3}$
$C = 0.3852$
$D = -2.1637$ In this characteristics, the maximum reduction gear ratio is 4, while the minimum reduction gear ratio is 0.786.

Figure 9:
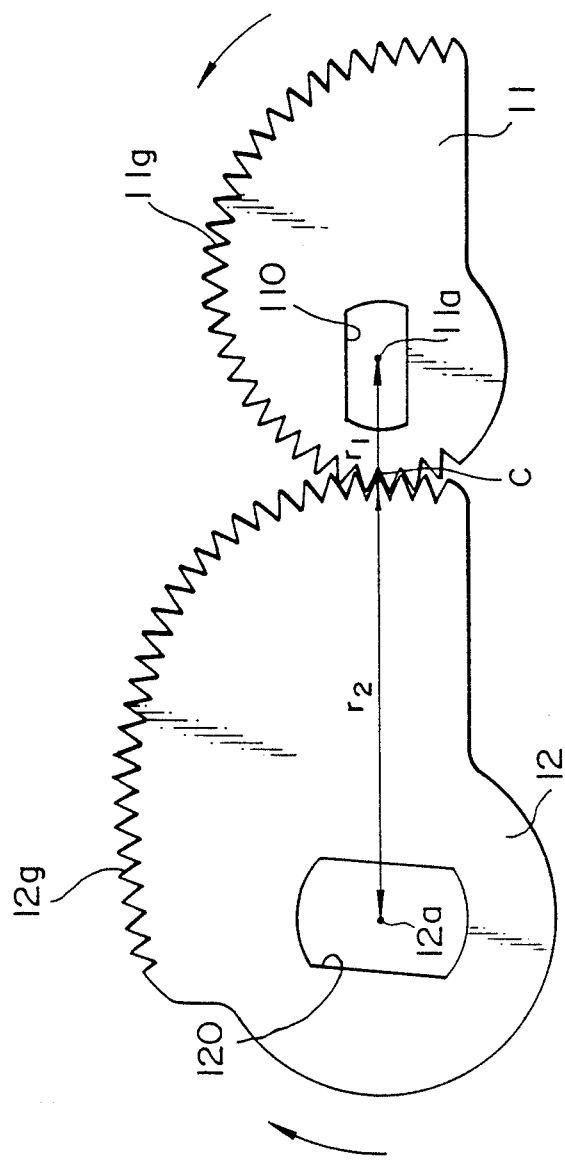
FIG. 9 is an enlarged view showing an engagement between the pinion and the gear shown in FIG. 8.

The specific arrangement of the geared transmitting mechanism 1 embodying the above characteristics is shown in FIG. 9. The pinion 11 meshes with the gear 12 at a position C residing on a line segment connecting an axis 11a of the pinion 11 to an axis 12a of the gear 12. Incidentally, reference numerals 11o and 12o designate openings provided for fitting the pinion 11 and the gear 12 onto the output shaft 41 and the valve shaft 22, respectively. From full closed position to full open position of the throttle valve, the relationships between a radius $r_1$ between the axis 11a and the position c and a radius $r_2$ between the axis 12a and the position C are as follows.
(i) The sum of radius $r_1$ and radius $r_2$ is constant; and
(ii) The radius ratio $r_2/r_1$ is identical to an inverse number of differential coefficient of the equation (1) or (2).

Namely, when the rotation angle of the output shaft 41 is between 0° to 48°, the radius ratio is constant, i.e. $r_2/r_1 = 4 (= 1/Y)$. When the rotation angle of the output shaft 41 is increased from 48° to 90°, the radius ratio $r_2/r_1$ is gradually decreased and finally becomes 0.786. More specifically, the radius ratio $r_2/r_1$ is changed with satisfying the inverse of the differential coefficient of the equation (2), i.e. $(3AX^2 + 2BX + C)^{-1}$. When the radius $r_2$ is larger than the radius $r_1$ ($r_2 > r_1$), the rotation of the output shaft 41 is reduced and transmitted to the valve shaft 22, while when the radius $r_2$ becomes smaller than the radius $r_1$ ($r_2 < r_1$), the rotation of the output shaft 41 is increased and transmitted to the valve shaft 22.

Figure 11:
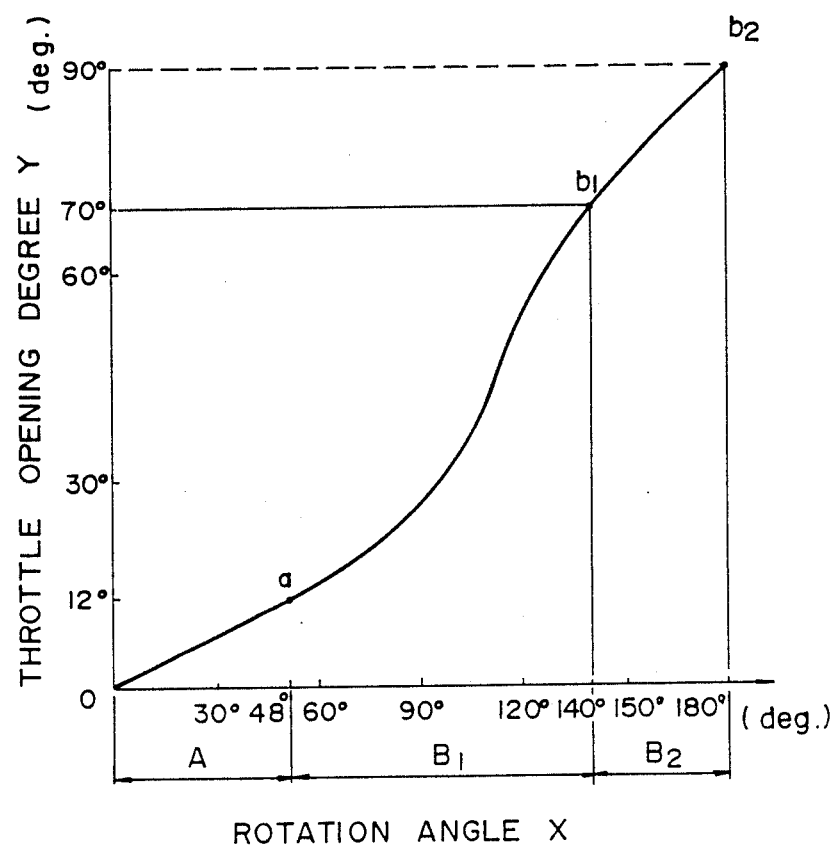

According to the characteristics shown in FIG. 10, since the opening degree of the throttle valve is rapidly increased at a higher opening degree portion thereof, the load of the actuator 4 is also rapidly increased. On the contrary, in still another embodiment, as shown in FIG. 11, the throttle valve 2 is not rapidly increased in the opening degree thereof at high opening degree thereof at high opening degree portion, but gradually increased. In this embodiment, the radius ratio $r_2/r_1$ is substantially held constant, in particular $r_2/r_1=1.25$, at high opening degree portion $b_1b_2$ (between 70° to 90°). On the contrary, in low opening degree portion $0a$, the radius ratio $r_2/r_1$ is maintained four ($r_2/r_1=4$), the same as the embodiment shown in FIG. 10, so as to hold a proper resolution power. The characteristics must correspond to a quintic function, between the point a and the point b, which selected as the lowest order function from the functions satisfying the following conditions.

(i) Coincide at the points a and $b_1$ with the linear parts $0a$ and $b_1b_2$, respectively.

(ii) Coincide at the points a and $b_1$ with the linear parts $0a$ and $b_1b_2$, respectively, in differential coefficient.

(iii) Coincide at the points a and $b_1$ with the linear parts $0a$ and $b_1b_2$, respectively, in second order differential coefficient.

According this, it can be possible to avoid a rapid increase in the opening degree of the trottle valve, which increase is appeared in FIG. 10.

Further, it may be possible that the characteristics between the point a and the point $b_2$ correspond to a quartic function in which a maximum differential coefficient is below the predetermined value.

What is claimed is:

1. An apparatus for controlling intake air flow rate in an internal combustion engine, said apparatus comprising:

throttle valve means disposed in intake air passage means of said engine for swing movement so as to change a flow rate of air to be supplied to combustion chamber means of said engine;

means for determining a full closed position of said throttle valve;

resilient means for continually urging said throttle valve towards said full closed position;

a control unit for determining a desired opening degree of said throttle valve in accordance with requirements on said engine;

actuator means for generating a driving force for swinging said throttle valve means towards said desired opening degree in accordance with a command signal from said control unit; and a geared mechanism for transmitting said driving force to said throttle valve means, said geared mechanism including a pair of gears, each of which has a gear tooth portion, said gears being able to engage with each other exclusively at said gear tooth portions thereof, and said gear tooth portion so extending that both of said gear tooth portions mesh with each other between full closed position and full open position of said throttle valve, and they are pushed out of mesh from each other over full open position of said throttle valve.

2. An apparatus according to claim 1, wherein said gear of said geared mechanism is a sector wheel.

3. An apparatus according claim 1, wherein 1, wherein said gear tooth portion extends along a part of non-circular periphery.

4. An apparatus according to claim 3, wherein said non-circular periphery is an ellipsoidal periphery.

5. An apparatus according to claim 1, wherein said geared mechanism has a linear gear ratio.

6. An apparatus according to claim 1, wherein said geared mechanism has a non-linear gear ratio.

7. An apparatus according claim 6, wherein said non-linear gear ratio includes a linear part in a low opening degree of said throttle valve, and a curved par represented by a higher order function in a high opening degree of said throttle valve.

8. An apparatus according to claim 5, wherein said geared mechanism is of the reduction gear type.

* * * * *